United States Patent
Gray et al.

(10) Patent No.: US 12,388,661 B2
(45) Date of Patent: Aug. 12, 2025

(54) CROSS-CERTIFICATION FOR SECURE BINDING OF CRYPTOGRAPHIC SYSTEMS

(71) Applicant: Entrust Corporation, Shakopee, MN (US)

(72) Inventors: John Robert Gray, Nepean (CA); Michael Ounsworth, Sioux Lookout (CA); Serge Jean Maurice Mister, Ottawa (CA)

(73) Assignee: Entrust Corporation, Shakopee, MN (US)

( * ) Notice: Subject to any disclaimer, the term of this patent is extended or adjusted under 35 U.S.C. 154(b) by 347 days.

(21) Appl. No.: 17/344,463

(22) Filed: Jun. 10, 2021

(65) Prior Publication Data

US 2021/0392002 A1     Dec. 16, 2021

Related U.S. Application Data

(60) Provisional application No. 63/037,858, filed on Jun. 11, 2020.

(51) Int. Cl.
| | |
|---|---|
| *H04L 29/06* | (2006.01) |
| *H04L 9/06* | (2006.01) |
| *H04L 9/32* | (2006.01) |

(52) U.S. Cl.
CPC .......... *H04L 9/3268* (2013.01); *H04L 9/0643* (2013.01); *H04L 9/3236* (2013.01); *H04L 9/3247* (2013.01)

(58) Field of Classification Search
None
See application file for complete search history.

(56) References Cited

U.S. PATENT DOCUMENTS

| | | | | |
|---|---|---|---|---|
| 6,092,201 A | * | 7/2000 | Turnbull | H04L 9/3268 380/278 |
| 6,134,550 A | * | 10/2000 | Van Oorschot | G06Q 20/38215 707/999.009 |
| 6,247,127 B1 | * | 6/2001 | Vandergeest | H04L 63/123 713/100 |
| 6,865,674 B1 | * | 3/2005 | Mancini | H04L 63/0823 713/157 |

(Continued)

OTHER PUBLICATIONS

Nystrom et al., RFC 2986, "PKCS #10: Certification Request Syntax Specification Version 1.7", Nov. 2000, p. 1-14. (Year: 2000).*

(Continued)

*Primary Examiner* — Jeffery L Williams
(74) *Attorney, Agent, or Firm* — Merchant & Gould, P.C.

(57) ABSTRACT

Methods and systems for cross-certification to bind together two cryptographic systems are disclosed. One method includes receiving, from a first certificate authority at a second certificate authority, a cross certificate request, the cross certificate request including an attribute unique to the first certificate authority. The method also includes calculating a signature at the second certificate authority based at least in part on the attribute, and calculating a hash value based on a combination of the signature calculated at the second certificate authority and a key associated with the second certificate authority. The method includes generating a cross certificate and embedding the hash value as a certificate extension within the cross certificate.

16 Claims, 11 Drawing Sheets

(56) References Cited

U.S. PATENT DOCUMENTS

| | | | | |
|---|---|---|---|---|
| 7,290,133 | B1* | 10/2007 | Montgomery | H04L 9/3263 713/175 |
| 7,793,097 | B2* | 9/2010 | Peters | H04L 9/3263 713/156 |
| 10,425,401 | B1* | 9/2019 | Pecen | H04L 63/0815 |
| 10,841,295 | B1* | 11/2020 | Pecen | H04L 9/3268 |
| 11,888,997 | B1* | 1/2024 | Bowen | H04L 9/3247 |
| 12,132,846 | B2* | 10/2024 | Kumar | H04L 9/321 |
| 2006/0136719 | A1* | 6/2006 | Doyle | H04L 9/3265 713/157 |
| 2008/0091940 | A1* | 4/2008 | Dean | H04L 9/3265 713/157 |
| 2009/0210703 | A1* | 8/2009 | Epstein | H04L 9/006 713/157 |
| 2011/0231662 | A1* | 9/2011 | Sato | H04L 9/3268 713/176 |
| 2014/0223186 | A1* | 8/2014 | Brown | H04L 9/3263 713/176 |
| 2016/0352521 | A1* | 12/2016 | Choi | H04L 9/3247 |
| 2017/0318010 | A1* | 11/2017 | Fu | G06F 21/316 |
| 2017/0346639 | A1 | 11/2017 | Muftic | |
| 2018/0091314 | A1* | 3/2018 | Li | G06F 21/57 |
| 2018/0351751 | A1 | 12/2018 | Kumar et al. | |
| 2019/0317924 | A1 | 10/2019 | Alimi et al. | |
| 2020/0028699 | A1* | 1/2020 | Sharifi Mehr | H04L 9/14 |
| 2021/0392002 | A1* | 12/2021 | Gray | H04L 9/3268 |
| 2022/0158851 | A1* | 5/2022 | Shin | H04L 9/3247 |
| 2023/0093146 | A1* | 3/2023 | Gray | H04L 9/3265 713/156 |
| 2023/0269100 | A1* | 8/2023 | Duccini | H04L 9/3263 713/157 |

OTHER PUBLICATIONS

Schaad, RFC 4211, "Internet X.509 Public Key Infrastructure Certificate Request Message Format (CRMF)", Sep. 2005, p. 1-40. (Year: 2005).*

Zeilenga, RFC 4523, "Lightweight Directory Access Protocol (LDAP) Schema Definitions for X.509 Certificates", Jun. 2006, p. 1-24. (Year: 2006).*

Cooper et al., RFC 5280, "Internet X.509 Public Key Infrastructure Certificate and Certificate Revocation List (CRL) Profile", May 2008, p. 1-151. (Year: 2008).*

Steve Lloyd, "Understanding Certification Path Construction", PKI Forum, White Paper, Sep. 2002, p. 1-14. (Year: 2002).*

"Signature", Microsoft Computer Dictionary, Third Edition, Microsoft Press, 1997, p. 435. (Year: 1997).*

International Search Report and Written Opinion for Application No. PCT/US2021/036860 mailed Sep. 29, 2021.

Song et al., "A New Digital Signature and Certificate Architecture with Shortest Certification Path," International Conference on Research in Networking 2004, LNCS, vol. 3042, pp. 1-12 (2004).

J. Schaad, Soaring Hawk Consulting, "Internet X.509 Public Key Infrastructure Certificate Request Message Format (CRMF)," Standars Track, Sep. 2005, 40 Pages.

European Search Report and Preliminary Opinion for EP Application No. 21821376.7 mailed Aug. 2, 2024.

* cited by examiner

CROSS-CERTIFICATION FOR SECURE BINDING OF CRYPTOGRAPHIC SYSTEMS

CROSS-REFERENCE TO RELATED APPLICATIONS

The present application claims priority to U.S. Provisional Patent Application No. 63/037,858, filed on Jun. 11, 2020, the disclosure of which is hereby incorporated by reference in its entirety.

BACKGROUND

In cryptography, a certificate authority or certification authority (CA) is an entity that issues digital certificates. A digital certificate certifies the ownership of a public key by the named subject of the certificate. This allows others (relying parties) to rely upon signatures or on assertions made about the private key that corresponds to the certified public key. A CA acts as a trusted third party—trusted both by the subject (owner) of the certificate and by the party relying upon the certificate. The format of these certificates is specified by the X.509 standard.

In this context, a root certificate is a public key certificate that identifies a root certificate authority (CA). Root certificates are self-signed and form the basis of an X.509-based public key infrastructure (PM). Additionally, a certificate authority can issue multiple certificates in the form of a tree structure. A root certificate is the top-most certificate of the tree, the private key of which is used to "sign" other certificates. All certificates signed by the root certificate, with the "CA" field set to true, inherit the trustworthiness of the root certificate. Such a certificate is called an intermediate certificate or subordinate CA certificate. Certificates further down the tree also depend on the trustworthiness of the intermediates.

Cross certificates generally correspond to a certification of a root key of a Certificate Authority (CA) that is signed by another Certificate Authority (CA). This provides trust between the two certificate authorities in the direction of the certification. For example, a first CA sends its public key to a second CA, and the second CA generates a cross certificate by signing that public key with its own private key. Thereon, any certificates issued by the first CA will now be trusted by the second CA, or entities that trust that second CA. This may not only occur with respect to root certificates, but intermediate certificates as well.

For trust to be bidirectional, a cross certificate pair is issued, where the second CA also sends its public key to the first CA and the first CA generates a cross certificate by signing the second CA's public key with its own private key. Once this two-way key exchange and signing process is complete, the two CAs can trust each other.

However, if one of the two root keys is compromised, there is no convenient way for the other root to detect tampering. In this instance, the second (non-compromised) root would trust any forged certificates from the first root.

Traditionally, compromise of root certificates is of somewhat low risk due to the complex computational demands required to compromise a certificate constructed using RSA or elliptic curve key generation techniques. However, with improvements in computing technology, including the advent of quantum computing, the time required to compromise a certificate is expected to drastically decrease. Accordingly, alternative keying structures are being investigated. However, those alternative keying structures may need to be cross-compatible with existing X.509 standard systems. Accordingly, improvements in the way in which CAs may trust each other, and detect tampering, are desired.

SUMMARY

In general, the present disclosure relates to cross-certification between two different cryptographic systems for purposes of securely binding the systems together. In some aspects, cross certificates may be generated that include attributes of the respective cryptographic systems and are securely signed across those attributes by the respective certificate authorities issuing the cross certificates, to provide a trusted binding between the two cryptographic systems.

In a first aspect, a computer-implemented method includes receiving, from a first certificate authority at a second certificate authority, a cross certificate request, the cross certificate request including an attribute unique to the first certificate authority. The method further includes, in response to receipt of the cross certificate request, calculating a signature at the second certificate authority based at least in part on the attribute. The method also includes calculating a hash value based on a combination of the signature calculated at the second certificate authority and a key associated with the second certificate authority; and generating a cross certificate and embedding the hash value as a certificate extension within the cross certificate.

In a second aspect, a system includes a first root certificate authority implementing a first digital signature scheme, the first root certificate authority being communicatively connected to a second root certificate authority implementing a second digital signature scheme different from the first digital signature scheme. The first root certificate authority executes instructions to: receive, from the second certificate authority, a cross certificate request, the cross certificate request including an attribute unique to the second certificate authority; in response to receipt of the cross certificate request, calculate a signature based at least in part on the attribute; calculate a hash value based on a combination of the signature and a key associated with the first certificate authority; and generate a cross certificate and embedding the hash value as a certificate extension within the cross certificate.

In a third aspect, a computer-implemented method includes receiving, from a first certificate authority at a second certificate authority, a cross certificate request, the cross certificate request including an attribute unique to the first certificate authority. The method further includes, in response to receipt of the cross certificate request, calculating a signature at the second certificate authority based at least in part on the attribute. The method also includes calculating a hash value based on a combination of the signature calculated at the second certificate authority and a key associated with the second certificate authority; and generating a cross certificate and embedding the hash value as a certificate extension within the cross certificate. The method further includes receiving, from the second certificate authority at the first certificate authority, a second cross certificate request, the second cross certificate request including a second attribute unique to the second certificate authority. The method also includes, in response to receipt of the second cross certificate request, calculating a second signature at the first certificate authority based at least in part on the second attribute. The method includes calculating a second hash value based on a combination of the second signature calculated at the first certificate authority and a key associated with the first certificate authority, and generating a second cross certificate and embedding the second hash value as a certificate extension within the second cross certificate.

DETAILED DESCRIPTION

As briefly described above, embodiments of the present invention are directed to methods and systems for cross certification of parallel PM certificates. In example embodiments, at the time of cross certification, each root certificate authority will submit a piece of information to be signed using a root key of the other root certificate authority. That signed piece of information can then be embedded to the cross certificates. This can be, for example, submitted as an attribute in a Certificate Request. In some example embodiments, a hash of the certificate of the root may be submitted.

As noted above, the methods and systems described herein are particularly useful in managing secure binding of two different cryptographic systems, such as an existing system using RSA or elliptic curve key generation, and a post-quantum key generation technique. The methods and systems described herein have further advantages in that a given entity need not maintain and/or carry certificates from both coexisting cryptographic systems, thereby reducing the amount of overhead in terms of bandwidth and/or processing required to select the appropriate key for validation purposes.

Figure 1:
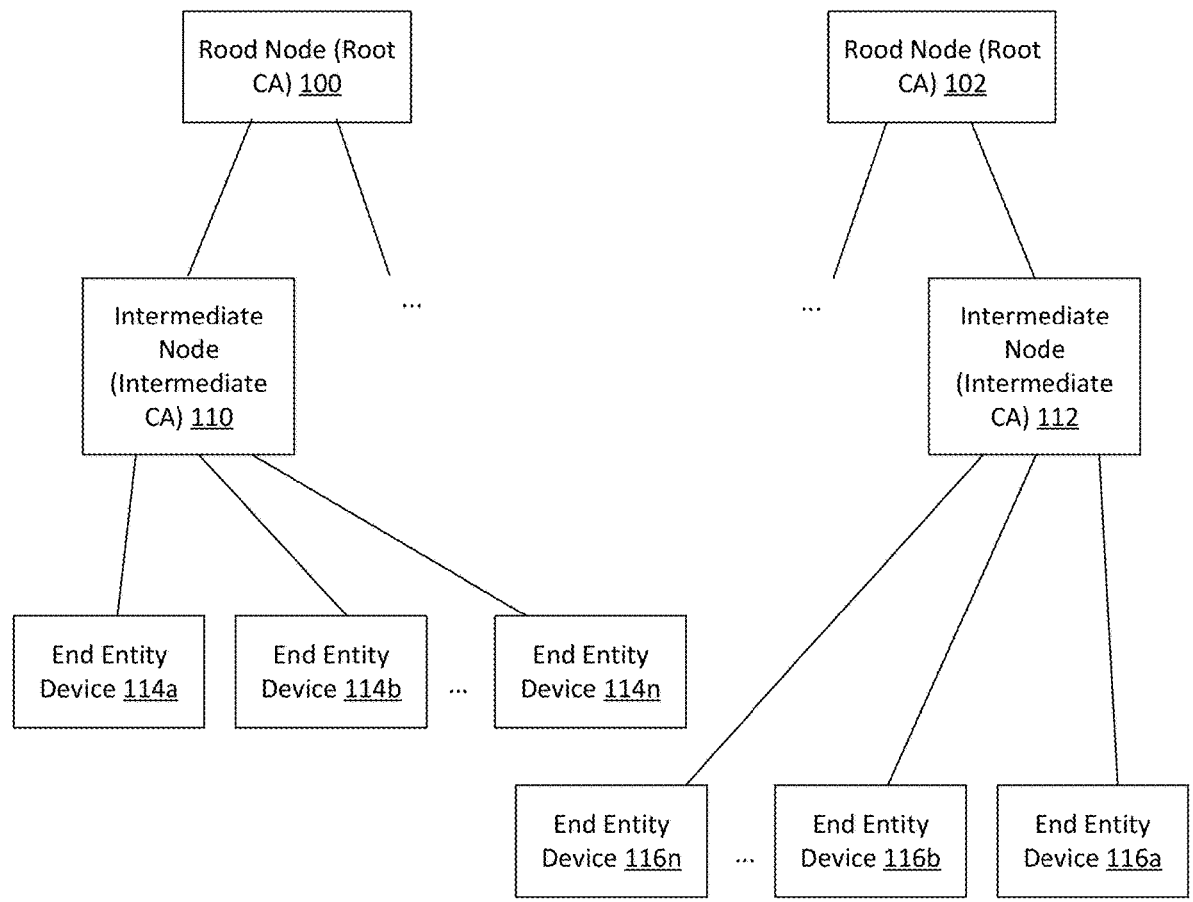
FIG. 1 illustrates an example environment including a plurality of digital signature systems in which aspects of the present disclosure may be implemented.

Referring first to FIG. 1, an example environment 10 in which aspects of the present disclosure may be implemented is shown. In the example environment 10, of a plurality of root nodes 100, 102 may be utilized. Each root node may implement a root certificate authority (CA). In other words, each root certificate authority may issue a root certificate useable within a different public key infrastructure (PM). However, each root certificate authority may be implemented to use a different digital signature scheme. For example, a first root certificate authority at root node 100 may utilize a RSA scheme, while a second root certificate authority at retail node 102 may utilize a different digital signature scheme, such as a SPHINCS+ or Dilithium (next generation) scheme.

In this example, each root node 100, 102 may be associated with one or more intermediate nodes. As shown, root node 100 is associated with one or more intermediate nodes 110, and root node 102 is associated with one or more intermediate nodes 112. Intermediate nodes 110, 112 may act as intermediate certificate authorities, and may receive intermediate certificates issued by (and signed by) the root certificate authorities. Additionally, intermediate nodes 110, 112 may, if acting as intermediate certificate authorities, issue certificates to one or more end entities 114$a$-$n$, 116$a$-$n$.

In this context, it is noted that a certificate generated by an intermediate node will be signed by a root node, indicating validity of the intermediate node certificate. Similarly, end entity certificates may be signed by the intermediate node, acting as intermediate certificate authority and using an intermediate certificate. Accordingly, starting at an end entity, trust chains may form back to the root node, via the end entity certificate, intermediate certificate, and root certificate. In this arrangement, the intermediate nodes and end entity nodes may elect to use a same digital signature scheme as a root node. In other words, in the example shown the intermediate node 110 and end entities 114$a$-$n$ will use a common digital signature scheme with root node 100, while intermediate node 112 and end entities 116$a$-$n$ are able to use a common digital signature scheme with root node 102.

As noted above, it may be that a particular enterprise or group of entities wishes to migrate from a first digital signature scheme (e.g., a first PM system) to a second digital signature scheme (e.g., a second PM system), while remaining within a backwards-compatible, general public key infrastructure. However this may be done gradually, such that certain nodes use an older digital signature scheme while other nodes using a newer digital signature scheme. Or, there may be other reasons to maintain two different digital signature schemes in parallel. In the example network 10 illustrated, validation of one end entity certificate or intermediate certificate with its root would not necessarily mean that another certificate is valid in the other digital signature scheme. Accordingly, methods and systems for binding together to digital signature schemes using cross certificates are described herein.

Figure 2:
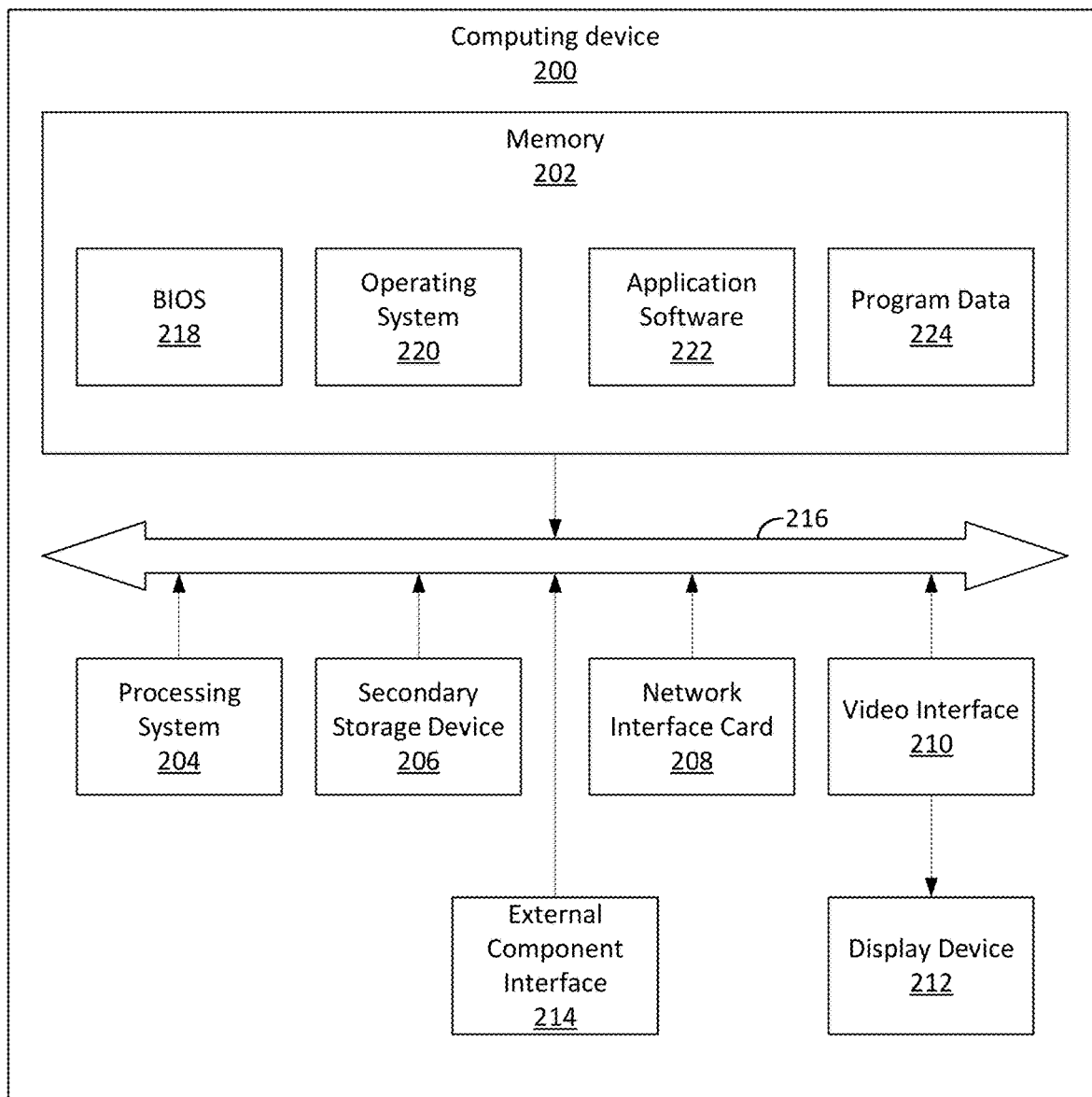
FIG. 2 illustrates an example computing device with which aspects of the present disclosure may be implemented.

FIG. 2 illustrates an example computing device 200 with which aspects of the present disclosure may be implemented. The example computing device 200 may be used to implement any individual entity or group of entities, such as the nodes 100, 102, 110, 112, 114$a$-$n$, and 116$a$-$n$ described above in conjunction with FIG. 1.

In the example of FIG. 2, the computing device 200 includes a memory 202, a processing system 204, a secondary storage device 206, a network interface card 208, a video interface 210, a display unit 212, an external component interface 214, and a communication medium 216. The memory 202 includes one or more computer storage media capable of storing data and/or instructions. In different embodiments, the memory 202 is implemented in different ways. For example, the memory 202 can be implemented using various types of computer storage media, and generally includes at least some tangible media. In some embodiments, the memory 202 is implemented using entirely non-transitory media.

The processing system 204 includes one or more processing units, or programmable circuits. A processing unit is a physical device or article of manufacture comprising one or more integrated circuits that selectively execute software instructions. In various embodiments, the processing system 204 is implemented in various ways. For example, the processing system 204 can be implemented as one or more physical or logical processing cores. In another example, the processing system 204 can include one or more separate microprocessors. In yet another example embodiment, the processing system 204 can include an application-specific integrated circuit (ASIC) that provides specific functionality. In yet another example, the processing system 204 provides specific functionality by using an ASIC and by executing computer-executable instructions.

The secondary storage device 206 includes one or more computer storage media. The secondary storage device 206 stores data and software instructions not directly accessible by the processing system 204. In other words, the processing system 204 performs an I/O operation to retrieve data and/or software instructions from the secondary storage device 206. In various embodiments, the secondary storage device 206 includes various types of computer storage media. For example, the secondary storage device 206 can include one or more magnetic disks, magnetic tape drives, optical discs, solid-state memory devices, and/or other types of tangible computer storage media.

The network interface card 208 enables the computing device 200 to send data to and receive data from a communication network. In different embodiments, the network interface card 208 is implemented in different ways. For example, the network interface card 208 can be implemented as an Ethernet interface, a token-ring network interface, a fiber optic network interface, a wireless network interface (e.g., WiFi, WiMax, etc.), or another type of network interface.

In optional embodiments where included in the computing device 200, the video interface 210 enables the computing device 200 to output video information to the display unit 212. The display unit 212 can be various types of devices for displaying video information, such as an LCD display panel, a plasma screen display panel, a touch-sensitive display panel, an LED screen, a cathode-ray tube display, or a projector. The video interface 210 can communicate with the display unit 212 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 214 enables the computing device 200 to communicate with external devices. For example, the external component interface 214 can be a USB interface, a FireWire interface, a serial port interface, a parallel port interface, a PS/2 interface, and/or another type of interface that enables the computing device 200 to communicate with external devices. In various embodiments, the external component interface 214 enables the computing device 200 to communicate with various external components, such as external storage devices, input devices, speakers, modems, media player docks, other computing devices, scanners, digital cameras, and fingerprint readers.

The communication medium 216 facilitates communication among the hardware components of the computing device 200. The communications medium 216 facilitates communication among the memory 202, the processing system 204, the secondary storage device 206, the network interface card 208, the video interface 210, and the external component interface 214. The communications medium 216 can be implemented in various ways. For example, the communications medium 216 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 202 stores various types of data and/or software instructions. The memory 202 stores a Basic Input/Output System (BIOS) 218 and an operating system 220. The BIOS 218 includes a set of computer-executable instructions that, when executed by the processing system 204, cause the computing device 200 to boot up. The operating system 220 includes a set of computer-executable instructions that, when executed by the processing system 204, cause the computing device 200 to provide an operating system that coordinates the activities and sharing of resources of the computing device 200. Furthermore, the memory 202 stores application software 222. The application software 222 includes computer-executable instructions, that when executed by the processing system 204, cause the computing device 200 to provide one or more applications. The memory 202 also stores program data 224. The program data 224 is data used by programs that execute on the computing device 200.

Although particular features are discussed herein as included within an electronic computing device 200, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 200 of FIG. 2, the computer-readable instructions are stored on devices that include non-transitory media. In particular embodiments, the computer-readable instructions are stored on entirely non-transitory media.

Figure 3:
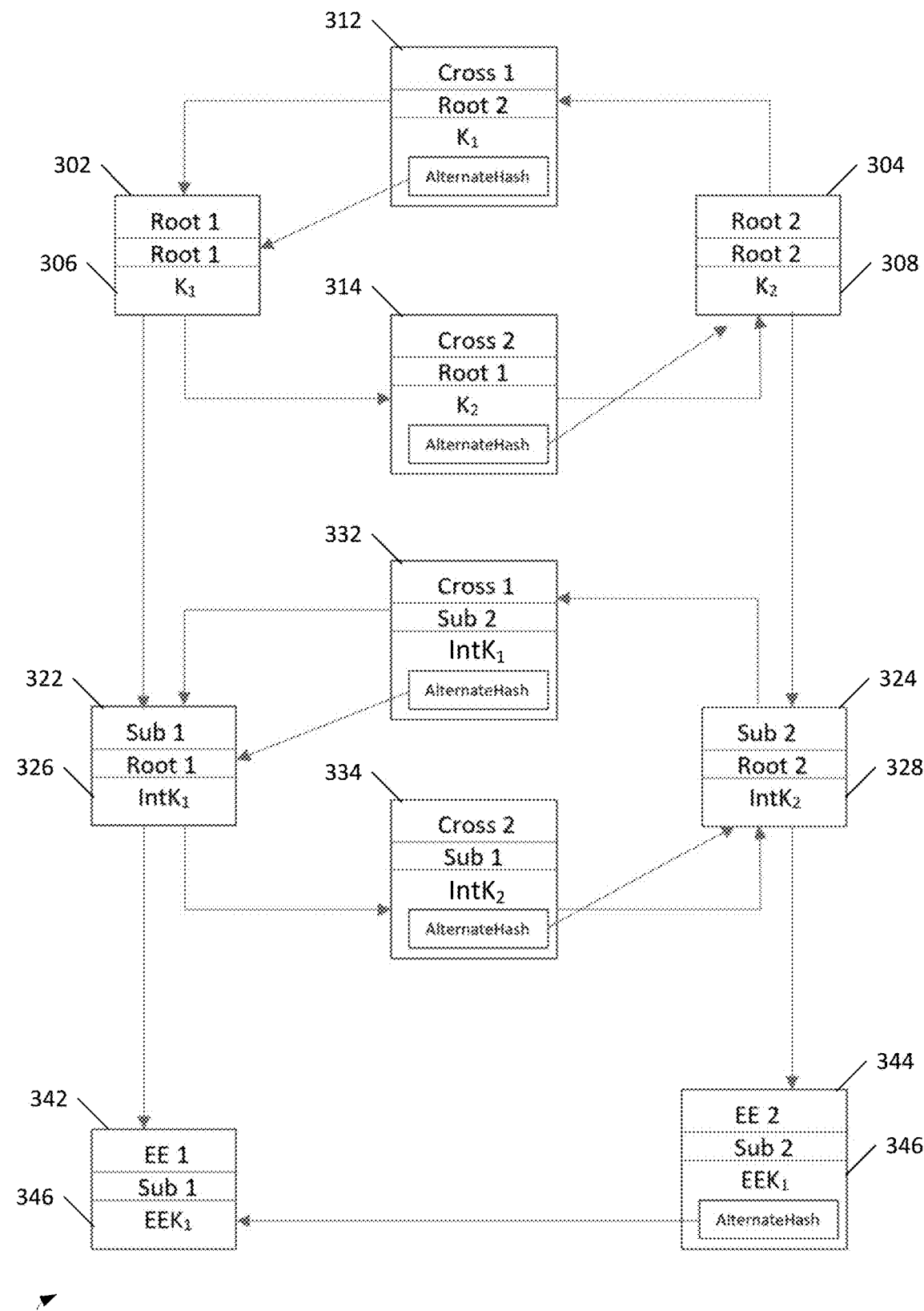
FIG. 3 illustrates an example parallel cross certification arrangement implemented according to an example embodiment of the present disclosure.

FIG. 3 illustrates an example parallel cross certification arrangement 300 implemented according to an example embodiment of the present disclosure. The example parallel cross certification arrangement 300 represents one possible manner in which certificates may be certified across two different PM systems.

In the example shown, a first root certificate 302 may be bound to a second root certificate 304 by one or more cross certificates 312, 314. In the example shown, the first root certificate 302 contains a key ($K_1$) 306 generated by the first root certificate authority (e.g., root node 100 of FIG. 1), and the second root certificate 304 contains a key ($K_2$) 308 generated by the second root certificate authority (e.g., root node 102 of FIG. 1).

In the example shown, the first cross certificate 312 may be generated at a second certificate authority. The first cross certificate 312 is signed by the second root certificate 304, and contains an attribute of the first root certificate 302. For example, the attribute may be an attribute unique to the first root certificate 302, such as a hash of a TBSCertificate component associated with the first root, e.g., including key ($K_1$) 306 generated by the first root certificate authority as well as other attributes embedded therein. The signature by the second root certificate 304 may be applied across the received attribute. In some cases, the first cross-certificate 312 can store a hash value that is based on a combination of the signature calculated at the second certificate authority and the key ($K_2$) 308 associated with the second certificate authority. This hash value may be stored in a certificate extension within the cross certificate 312.

Accordingly, the first cross certificate 312 will include information that is unique to the first root certificate 302 and the second root certificate 304 embedded within the hash value. Therefore, validating the cross-certificate, including validation of the certificate extension in accordance with the below, would also validate the binding between the root certificates 302, 304.

Similarly, as shown, a second cross certificate 314 may be generated at a first root certificate authority (e.g., root node 100 of FIG. 1), in response to a cross certificate request from a second root certificate authority (e.g., root node 102 of FIG. 1). In that instance, the request from the second root certificate authority can include an attribute unique to the second root certificate authority, for example a hash of the TBSCertificate component at the second root, e.g., including key ($K_2$) 308 generated by the second root certificate authority and other attributes associated therewith. In formulating the cross certificate 314, the first root certificate authority can generate a signature over a set of data including its own attributes and the received unique attribute of the first root certificate authority, and can generate a hash of that signature for inclusion in the cross certificate 314 (e.g., within a certificate extension). In this way, unique information from both root certificate authorities is included in the cross certificate 314, while reducing the overall information that is included by hashing the signature.

Still referring to FIG. 3, a similar cross certificates scheme may be applied between intermediate certificates 322, 324. In the example shown, the first intermediate certificate 322, referred to as "Sub 1" is signed by the first root certificate 302, and includes a key ($IntK_1$) 326, while the second intermediate certificate 324, referred to as "Sub 2", is a signed by the second root certificate 304 and includes a key ($IntK_2$) 328.

In this example, a first intermediate certificate authority that is associated with first intermediate certificate 322 may issue a cross certificate request to a second intermediate certificate authority associated with the second intermediate certificate 324 (e.g., intermediate nodes, as seen in FIG. 1). As with the root certificates, the first intermediate certificate authority may include in the cross certificate request information unique to the first intermediate certificate 322, such as a hash of a TBSCertificate component associated with the first root, e.g., including key ($IntK_1$) 326. The second intermediate certificate authority may then generate a cross certificate 332 which includes the unique attribute (e.g., the hash of the TBSCertificate of the first intermediate certificate authority) as well as a signature using the second root certificate 304 across information including that attribute. As above, in some examples the attribute information included in the cross-certificate 332 may be included in a hash of the signature, and may be stored in a certificate extension within the cross certificate 332. This is allowable because V3 extensions are allowed to extend behavior of X.509 compliant certificates.

Similarly, the second intermediate certificate authority that is associated with second intermediate certificate 324 may issue a cross certificate request to the first intermediate certificate authority. In that case, the second intermediate certificate authority may include in that request information unique to the second intermediate certificate 324, such as a hash of a TBSCertificate of the second intermediate certificate authority. The first intermediate certificate authority may then issue a cross certificate 334 which includes, in a certificate extension, information representing a signature by the intermediate certificate 322 across TBSCertificate of the first intermediate certificate authority.

In the example shown, two end entity certificates 342, 344 are shown. Generally, end entities will not be configured to sign other certificates. Accordingly, end entities are not shown as performing cross certification. Rather, in typical cases, end entities may request certification from the alternative PM system. Because of this, a first end entity may send a certification request to obtain end entity certificate 342; the first end entity may send a certification request to the second intermediate certificate authority 324, for certification of its public key. In the certification request to the second intermediate certificate authority 324, the first end-entity will generate its AlternateHash attribute and add it into the certification request as an attribute. Therefore, when the second intermediate certificate issues 344 it will contain the alternate hash. Accordingly, in the embodiment shown, a single end entity may hold both end entity certificates 342, 344; in such a circumstance, the same end entity public key 346 ($EEK_1$) is used with both end entity certificates. An enhanced verification system would be able to determine, based on a missing or tampered-with attribute that is included in the second end entity certificate 344 (shown as AlternateHash), whether tampering occurred. If the attribute is missing, tampering has occurred. Also, if the end entity key 346 $EEK_1$ is mismatched between end entity certificates, tampering has also likely occurred. Accordingly, both cryptographic systems must be compromised to compromise the system overall.

Figure 4:
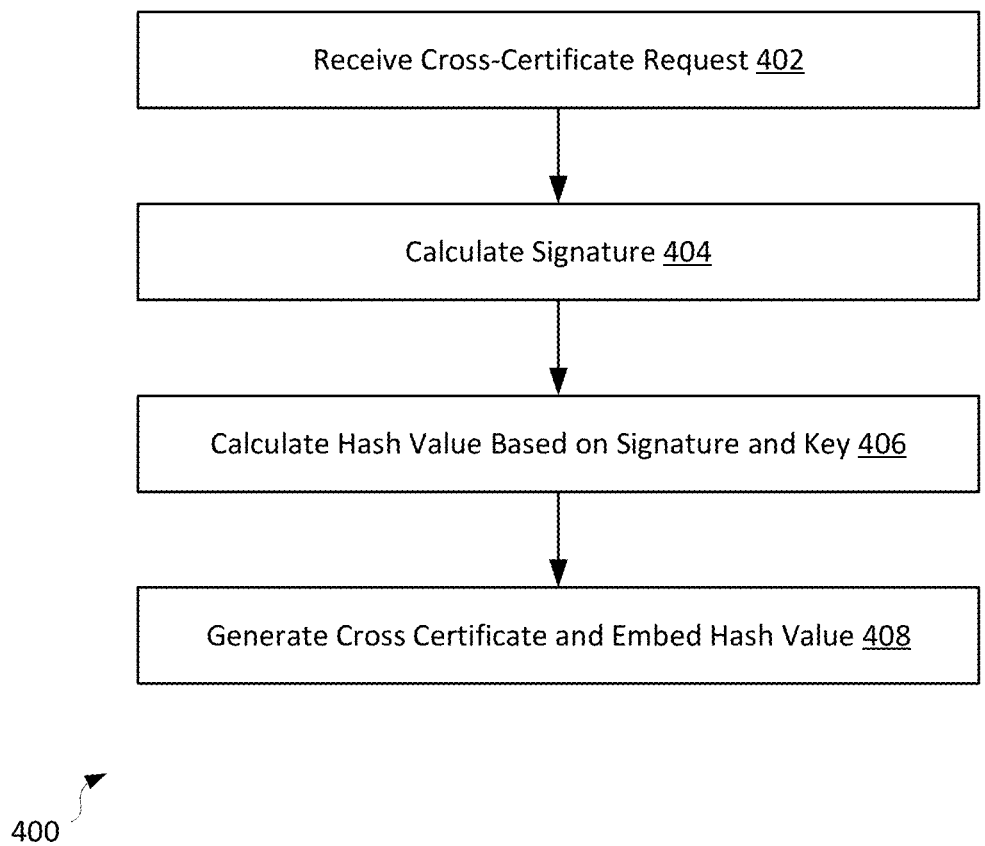
FIG. 4 is a flowchart of a method of binding digital signature systems using cross certificates, according to an example implementation.
Figure 5:
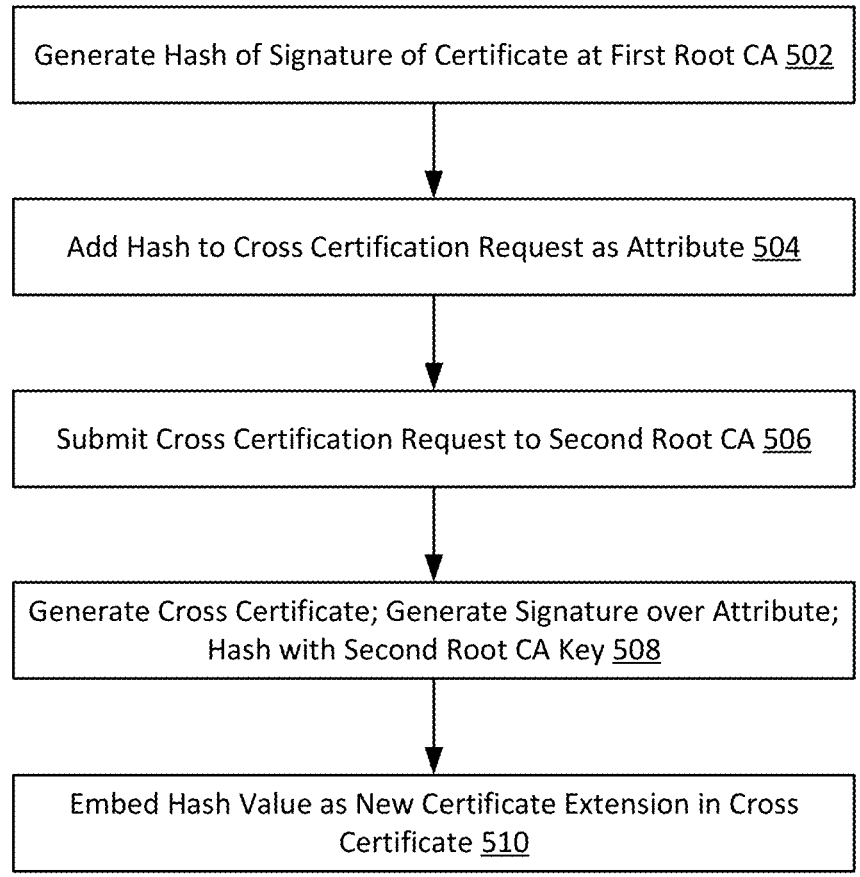
FIG. 5 is a flowchart of a method of binding two PM systems at root certificates using cross certificates, according to an example embodiment.
Figure 6:
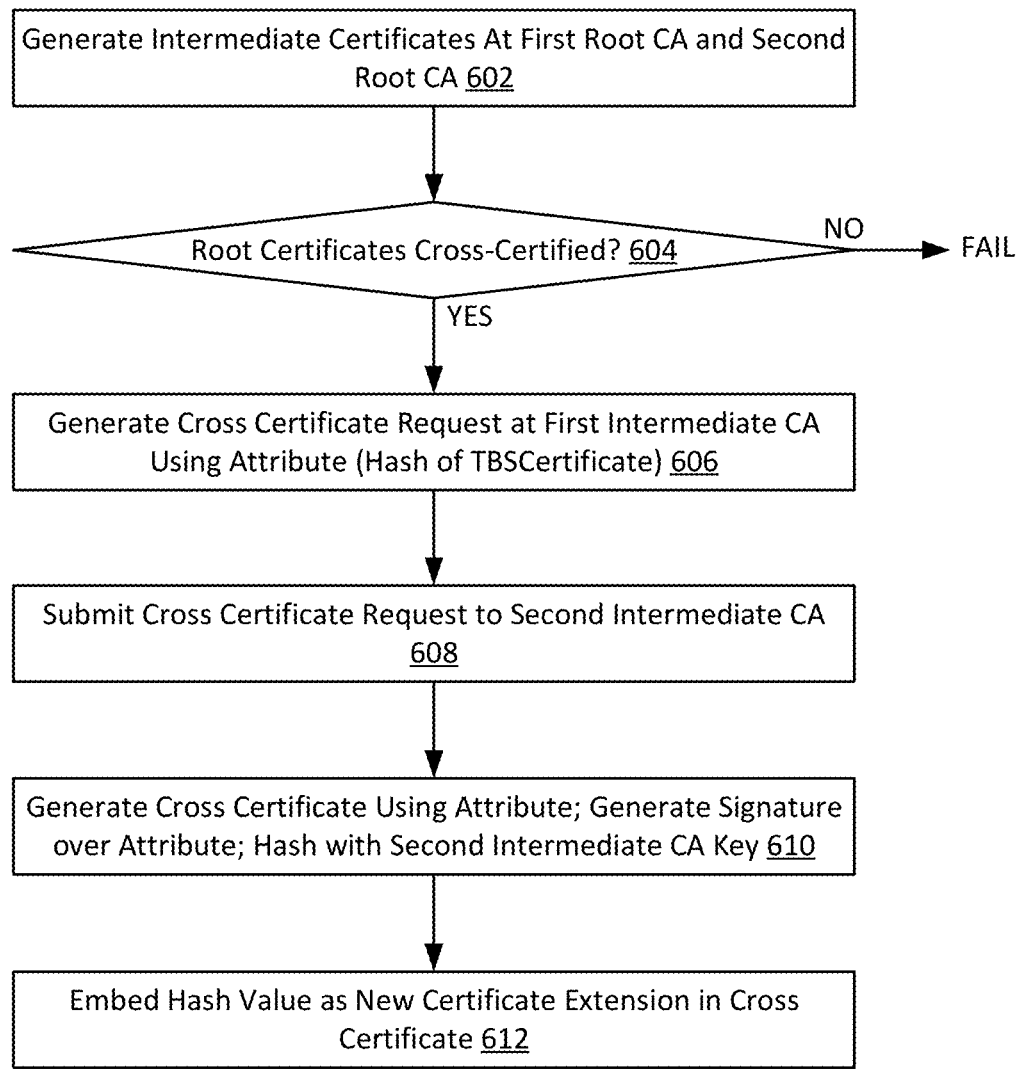
FIG. 6 is a flowchart of a method of binding two PM systems at intermediate certificates using cross certificates, according to an example embodiment.
Figure 7:
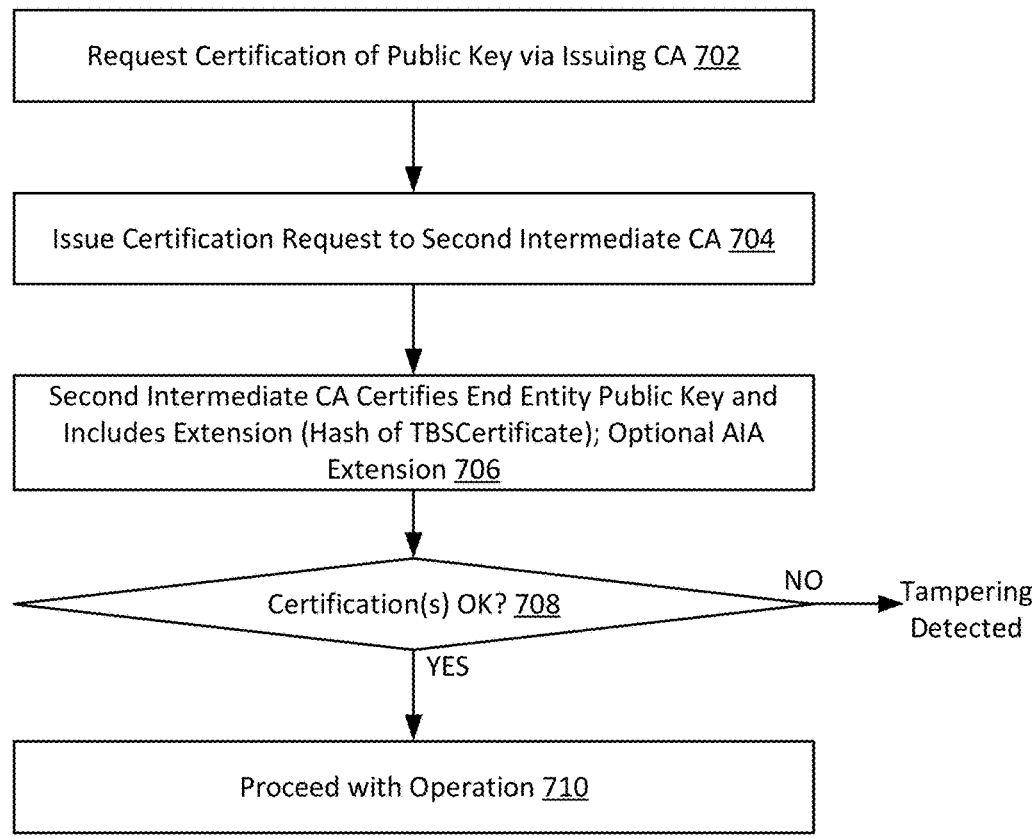
FIG. 7 is a flowchart of a method of establishing trust at end entities, according to an example embodiment.

Referring now to FIGS. 4-7, methods of binding two digital signature systems are shown using cross-certificates according to various example embodiments. FIG. 4 illustrates a general method, while FIG. 5 illustrates a method performed at root certificate authorities. FIG. 6 illustrates a method that may be performed at intermediate certificate authorities, while FIG. 7 illustrates a method that may be performed at end entity nodes.

FIG. 4 is a flowchart of a method 400 of binding digital signature systems using cross certificates, according to an example implementation. In the example shown, the method 400 includes receiving, from a first certificate authority at a second certificate authority, a cross certificate request (step 402). In this example, the cross certificate request including an attribute unique to the first certificate authority, such as a hash of a TBSCertificate associated with the first certificate authority. In some instances, the hash may be a predetermined hash method and applied to a TBSCertificate (a "to be signed" certificate) of the first certificate authority, including a key of the first certificate authority.

In response to receipt of the cross certificate request, the method 400 may further include calculating a signature at the second certificate authority (step 404). This signature generation is performed over a set of information including the attribute (e.g., the hash of the TBSCertificate). Additionally, the method 400 includes calculating a hash value based on a combination of that signature and a key that is associated with the second certificate authority (step 406). The second certificate authority can then generate the requested cross certificate, embedding this hash value as a certificate extension into the cross certificate (step 408). As noted above, the certificate extension may be a V3 certificate extension compatible with X.509 certificate standards.

It is noted that in some example embodiments, cross certificates are desired to be generated by each of the first certificate authority and the second certificate authority. In such cases, steps 402-406 may be performed by both certificate authorities prior to generation of the cross certificates.

Referring now to FIG. 5, a method 500 is shown that implements the general process seen in FIG. 4 in the context of a root certificate authority, such that two different root certificate authorities may cross bind (e.g., root nodes 100, 102 of FIG. 1). Typically, the two root certificate authorities may be root authorities associated with two different PM systems.

In the example shown at a first root certificate authority will generate a hash of the signature portion of its TBSCertificate (step 502). This has the effect of reducing the size of the signature, while maintaining a unique identifier of that signature (and therefore of the first root certificate authority). The first root certificate authority will then add this hash value as a new attribute type into a cross-certification request (step 504). The cross certification request may be for example compliant with the PKCS10 standard for submission of a certification request, as defined in RFC 2986. For example, in some instances, a certificate request could include an attribute having the following construct:

```
Attribute ::= SEQUENCE {
    type    AttributeType,
    values  SET OF AttributeValue
    -- at least one value is required --
}
AttributeType    ::=    OBJECT IDENTIFIER
AttributeValue   ::=    ANY DEFINED BY type
```

The method 500 further includes submission of the cross certification request to a second root certificate authority (step 506).

At the second root certificate authority, the cross certificate will be generated (step 508). This includes calculating a signature over the received attribute (e.g., hash value), and hashing the result of the signature in combination with a key of the second root certificate authority. The second root certificate authority will embed this hash value as a new certificate extension in the generated a cross certificate (step 510). An example structure for such a certificate extension including the hash attribute value may be as follows:

```
Extension ::= SEQUENCE {
    extnID      OBJECT IDENTIFIER,
    critical BOOLEAN DEFAULT FALSE,
    extnValue   OCTET STRING }
alternateHash ::== SEQUENCE {
    extnID                  <TBD>,
    critical                BOOLEAN DEFAULT FALSE,
    hashAttributeValue      HashAttributeValue
}
```

Referring to method 500 generally, it is recognized that the above described method results in generation of a single cross certificate by the second root certificate authority. In some examples, the method 500 may be repeated in an opposite direction, with the second root certificate authority issuing a cross certification request to the first root certificate authority, and the first root certificate authority generating a cross certificate using analogous operations.

Illustrating the method 500 in the context of the certificates shown in FIG. 3, root certificate authorities (e.g., root nodes 100, 102 of FIG. 1) may issue root certificates 302, 304, respectively, and implementing two different digital signature schemes, and accordingly, different PM systems. In this context, a first root certificate authority (e.g., root node 100) can issue a cross certificate request to the second root certificate authority (e.g., root node 102), including an attribute that includes a hash of the signature included in the first root certificate 302 (e.g., a hash of a TBSCertificate including, among other attributes, key ($K_1$) 306). The second root certificate authority will then issue the cross certificate 312 including a certificate extension that includes a hash of a signature using the second root certificate 304 over the received attribute hash. Similarly, the second root certificate authority can issue a cross certificate request to the first root certificate authority including an attribute that includes a hash of the signature included in the second root certificate 304 (e.g., a hash of the TBSCertificate of the second root certificate authority, including, among other elements, key ($K_2$) 308). The first root certificate authority will then issue the cross certificate 314 including a certificate extension that includes a hash of a signature using the first root certificate 302 over the received attribute hash.

It is noted that the above cross certification has a number of advantages relative to the existing methods of associating PM systems. In particular, use of the cross certificates may allow tampering or forgery to be detected when one of the two associated PM systems has been compromised. Additionally, the inclusion of cross certificates requires only a small enhancement to existing certificate issuance procedures, particularly those in which cross-certificates are already employed. Additionally, as noted below, the added requirements for validation are comparatively minimal. Furthermore, because hash values are used, certificate sizes remain manageable. Still further, while the above method requires enhancement to cross-certificates, existing root certificates remain unmodified.

Referring now to FIG. 6, a method 600 is shown for cross-certification of intermediate certificates. As illustrated in FIG. 1, each root certificate authority may issue multiple intermediate certificates to different entities. A root certificate that has been compromised would, if undetected, allow forged intermediate certificates to be created, and cross certified roots and associated entities would not be capable of detecting such tampering. Accordingly, the method 600 provides for cross certification of intermediate certificates, and is premised on cross-certification of root certificates being in place as well. For example, the method 600 may be used in combination with the method 500 described above with respect to FIG. 5.

In the example shown, the method 600 includes generation of intermediate certificates at root certificate authorities (step 602). The intermediate certificates may be provided, thereafter, to intermediate certificate authorities.

If binding two PM systems together at the intermediate certificate level is desired, and if the corresponding root certificates are cross bound as noted above in conjunction with FIG. 5 (as assessed at operation 604), a certificate request can be generated by one intermediate certificate authority, for transmission to another intermediate certificate authority, specifically requesting a cross certificate (step 606). As with the root certificate case, the certificate request should include a new attribute of the intermediate certificate to allow that intermediate certificate to be cross certified. In example embodiments, the attribute included can be a hash of a signature component of the TBSCertificate of the requesting entity.

Of course, if the root certificates are not cross certified at operation 604, the method 600 will fail, denying the ability to cross certify the intermediate certificates.

Once the cross certificate request is submitted to a second intermediate certificate authority, (at step 608), the second intermediate certificate authority can generate a cross certificate using the attribute (step 610). In example embodiments, generating the cross certificate includes generating a signature over the attribute, and hashing that signature (e.g., in combination with a key of the second intermediate certificate) to form a unique data attribute. That data attribute can then be embedded as a hash value within an extension of the cross certificate (step 612), e.g., a V3 extension as noted above.

As with the method 500 of FIG. 5, although the method 600 depicts a process for creation of one cross certificate, it is recognized that a complementary cross certificate may be created by using the same process, but issuing the certificate request from the other of the intermediate certificate authorities (e.g., from the second intermediate certificate authority to the first intermediate certificate authority).

Illustrating the method 600 in the context of the certificates shown in FIG. 3, intermediate certificate authorities (e.g., intermediate nodes 110, 112 of FIG. 1) may receive intermediate certificates. In this context, an intermediate certificate authority (e.g., intermediate node 110) can issue a cross certificate request to the second intermediate certificate authority (e.g., intermediate node 112), including an attribute that includes a hash of the signature included in the first intermediate certificate 322 (e.g., a hash of a TBSCertificate associated with the first intermediate certificate authority, including key (IntK$_1$) 326). The second intermediate certificate authority can then issue the cross certificate 332 including a certificate extension that includes a hash of a signature using the second intermediate certificate 324 over the received attribute hash. Similarly, the second intermediate certificate authority can issue a cross certificate request to the first intermediate certificate authority including an attribute that includes a hash of the signature included in the second intermediate certificate 324 (e.g., a hash of a TBSCertificate component associated with the second intermediate certificate authority, which can include key (IntK$_2$) 328). The first intermediate certificate authority will then issue the cross certificate 334 including a certificate extension that includes a hash of a signature using the first intermediate certificate 322 over the received attribute hash.

It is noted that the above cross certification of intermediate certificates has a number of advantages relative to the existing methods of associating PM systems, similar to those described above with respect to FIG. 5. In particular, the use of cross certificates allows for detection of tampering or forgery when either the two PM systems is broken. Furthermore, the additional validation procedures required to assess cross certificates are minimal, and that with prior validation procedures. Still further, certificates remain of similar size due to the use of hash values to exchange unique identifiers between intermediate certificate authorities. Also, intermediate certificates remain unchanged, with only intermediate cross certificates being modified.

In some embodiments, even where cross certificates are used at the root certificate level, use of cross certificates at intermediate certificate authorities may not be used while binding between two PM systems is maintained. In such cases, the signed TBSCertificate hash could be included within the intermediate certificates themselves. This may be particularly applicable in a system using two certificate authorities which issue certificates to the same intermediate and end entities. However, in this alternative embodiment, enrollment with a certificate authority may become more difficult, since a pre-certificate request would be required.

Referring now to FIG. 7, an example method 700 of establishing trust at end entities is illustrated. In this example, since end entity certificates generally are not permitted to sign other certificates, cross certification of end entity certificates is sub optimal, because it would not be compliant with typical standards for PM systems. Accordingly, as illustrated, an end entity may become certified by requesting certification of its public key from the certificate authority that issued the certificate to that end entity (step 702). This may be, for example, an intermediate certificate authority, but could also be a root certificate authority. In that the request for certification, an attribute may be included that appends a hash of the TBSCertificate of the existing end entity, including that end entity key (e.g., a public key, such as EEK$_1$ 346.

In example embodiments, a request is submitted to an intermediate certificate authority (step 704). In this case, an intermediate certificate authority will certify the end entity public key, and include an extension in that certification (step 706). This can include, for example, including as an extension a hash of the TBSCertificate within the end entity certificate. Such an arrangement can be seen in FIG. 3, within end entity certificate 344, received from intermediate certificate authority 324.

Concurrently, the same end entity may receive an end entity certificate 342 from another intermediate certificate authority, e.g., intermediate certificate authority 322. In other words, end entity certificates 342, 344 may be held by the same end entity, and therefore use the same end entity public key 346 (EEK$_1$).

In alternative embodiments, the intermediate certificate authority 324 could include an extension that references a location of the original end entity certificate (e.g., certificate 342). In such cases, the location of the original end entity certificate would be included in the certificate request issued by the end entity.

Upon determination, at operation 708, that the end entity is certified, the alternate intermediate certificate authority would return an indication of trust to the end entity (step 710). However, if the end entity cannot be certified, tampering may have occurred, in which case the method 700 fails and optionally new certificates are issued to one or more of the end entity, the intermediate certificate authority, and/or the root certificate authority.

Referring to method 700 generally, it is noted that in some embodiments, the extension including the hash of the TBS Certificate and/or extension could be included in the original end entity certificate (e.g., within certificate 342). However, in such cases, the end entity certificate should be generated at the same time as the corresponding (alternate) end entity certificate, and/or would be generated in a manner inconsistent with X.509 standards.

Additionally, in accordance with the method 700, it is noted that an alternate end entity certificate can be used to detect tampering with the end entity certificate, since that alternate end entity certificate may include the extension referencing the location or having unique information regarding the original end entity certificate. A location of the alternate end entity certificate that includes the relevant extension may be provided using an Authority Information Access (AIA) extension (although other extension types may be used). An example structure useable to store such a hash attribute location is as follows:

```
AuthorityInfoAccessSyntax ::=
    SEQUENCE SIZE (1..MAX) OF AccessDescription
AccessDescription ::= SEQUENCE {
    accessMethod        OBJECT IDENTIFIER,
    accessLocation      GeneralName }
    accessLocation      InfoAccess
```

Additionally, the method 700 requires a single extra certificate generation to add this additional layer of protection. Furthermore, the method 700 is backwards compatible with existing PM systems, while managing certificate sizes at a minimum added size. Furthermore, the original end entity certificate remains unchanged, with only the alternative end entity certificate (e.g., an added certificate that is used according to a new PM system (e.g., a post-quantum digital signature scheme, such as a Dilithium) would be modified.

Figure 8:
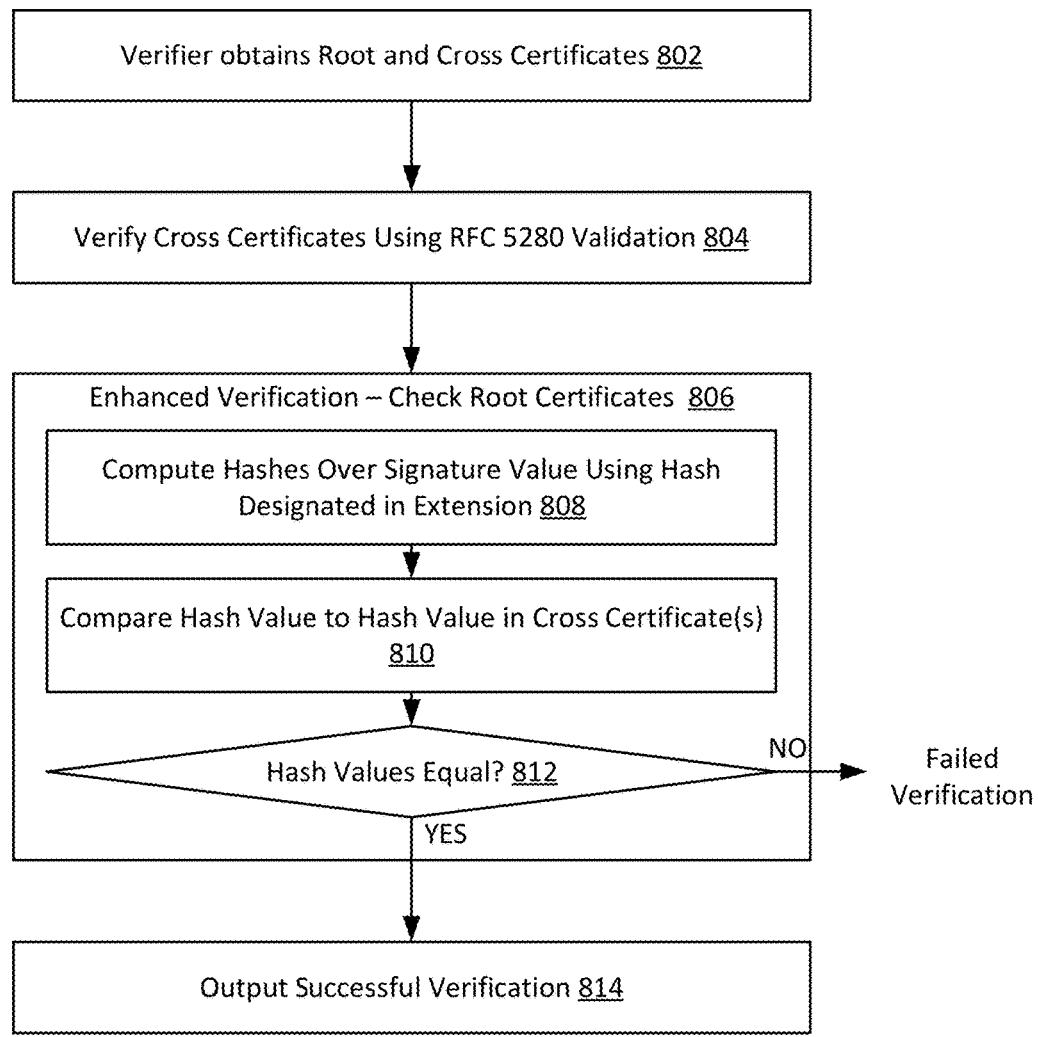
FIG. 8 is a flowchart of a method of validating a binding between two PM systems at root certificates, according to an example embodiment.
Figure 9:
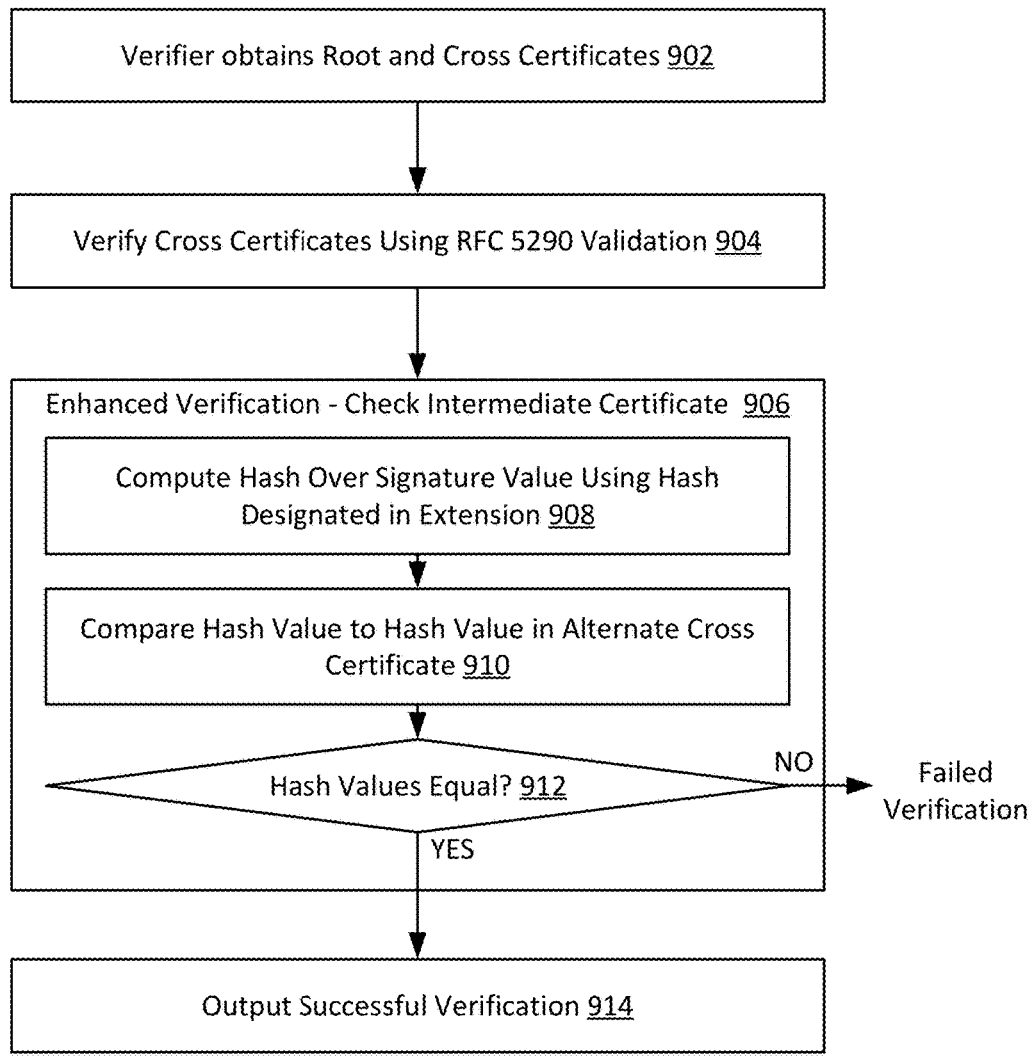
FIG. 9 is a flowchart of a method of validating a binding between two PM systems at intermediate certificates, according to an example embodiment.
Figure 10:
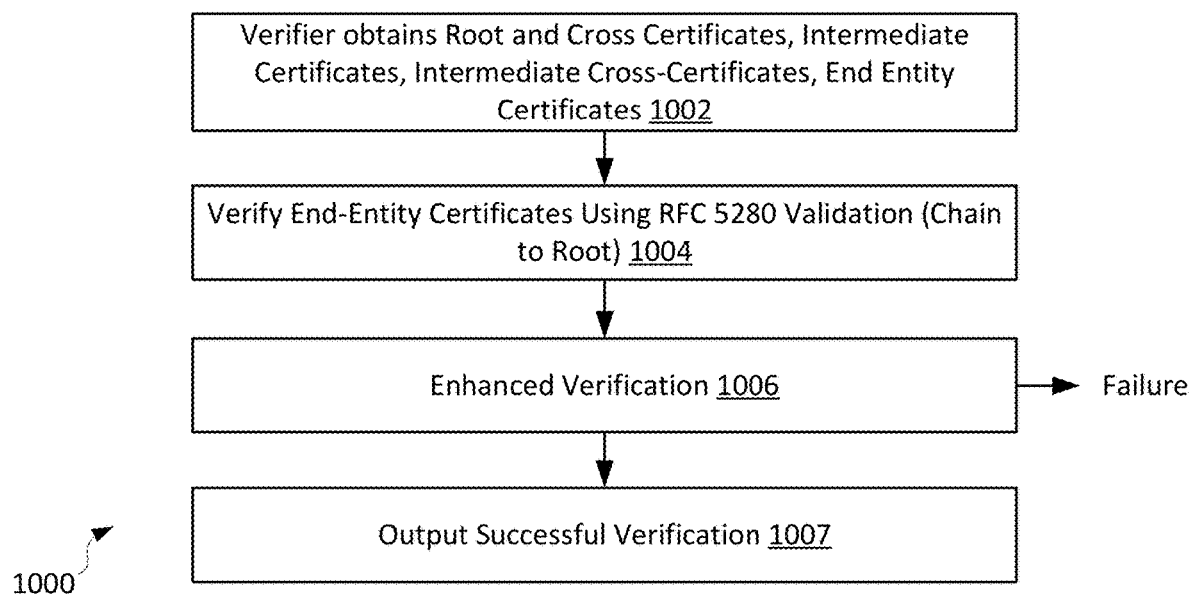
FIG. 10 is a flowchart of a method of performing end entity path validation across two PM systems, according to an example embodiment.

Referring now to FIGS. 8-10, methods of validating a binding between two different PKI systems are disclosed. FIG. 8 illustrates validation occurring at the root certificate level, while FIG. 9 illustrates validation of a binding via cross certificates at intermediate certificates. FIG. 10 illustrates validation of a binding between two PM systems at the end entity level.

In general, the methods described herein may be performed using a verifier. The verifier may be, for example, any device or entity useable to validate a certificate chain of that would receive the root certificate for validation. For example, this may occur at the root certificate authority, or may occur at a client device that is requesting verification of the root certificate (e.g., to validate a certificate chain which may require validation of an end entity certificate, intermediate certificate, and root certificate). Alternatively, the verifier can be any verifying entity that can act as a validation authority providing information on behalf of a certificate authority.

As seen in FIG. 8, a method 800 is shown for validation of a binding between two PM systems at root certificates. The method 800 may be performed, for example, to ensure that the cross-certification between root certificates described above in conjunction with FIG. 5 remains valid.

In the example shown, the method 800 includes obtaining a root certificate and cross-certificates between the root certificate and the corresponding alternative root certificate at a verifier (step 802). For example, in the context of FIG. 3, each of certificates 302, 304, 312, 314 are retrieved. Upon receipt of the root certificate and the cross certificates, the verifier can perform traditional verification of the cross certificates using, for example, validation process is described in RFC 5280 (step 804).

In the example shown, the method 800 further includes an enhanced verification process (step 806). This enhanced verification process will verify the root certificate being verified relative to the cross certificate signed by the alternate root certificate authority, and will also verify the alternate root certificate relative to the cross certificate signed by the original root certificate authority.

Specifically, the enhanced verification process may include computing a hash over the signature value of the certificate being verified (step 808). When verifying the original root certificate, the hash will be taken over the signature value of that root certificate (which was signed over the TBSCertificate data). The hash algorithm used may be a hash algorithm specified in the extension that is included in the cross certificate signed by the alternate root certificate authority (i.e., the root certificate authority of the alternative PM system to the root being verified). An example attribute that may be included in the cross certificate for defining a hash algorithm may be structured as follows:

```
AlternateHashAttribute :: SEQUENCE {
    alternateHashAttributeType :=   <TBD>
    alternateHashAttributeValue := HashAttributeValue
}
HashAttributeValue ::=SEQUENCE {
    hashAlgorithm       AlgorithmIdentifier,
    tbsSignatureHash    OCTET STRING -- Hash of TBSCertificate Signature Value
}
```

In the example shown, the computed hash value may then be compared to a hash value included in the cross certificate that was signed by the alternate root certificate authority (step 810). At operation 812 it is determined whether the hash values are equal. If the hash values are not equal, the enhanced verification will fail. However, if the hash values are equal, at least from the perspective of the root certificate, that certificate is verified.

Notably, the enhanced verification process will also be performed on the alternative root certificate. Specifically, a hash will be taken over the signature value of the alternate root certificate, and compared to a hash value included in the cross certificate that was signed by the original root certificate authority.

Assuming that both sets of hash values match, a successful verification of the root certificate is determined (step 814).

By way of illustration of the method 800 within the context of the arrangement shown in FIG. 3, in step 804, cross certificates 312, 314 would be validated using RFC 5280 processes. Then, during an enhanced verification process, validation of root certificate 302 would involve comparison of hash values between the hash of the signature in root certificate 302 and the alternateHash extension value in the cross-certificate 312, and validation of root certificate 304 would involve comparison of hash values between the hash of the signature in root certificate 304 and the alternateHash extension value in the cross certificate 314.

FIG. 9 is a flowchart of a method 900 of validating a binding between two PM systems at intermediate certificates, according to an example embodiment. Generally, the method 900 is similar to the method 800 of FIG. 8, performed at the intermediate certificate level (assuming that cross-certificates exist between the two intermediate certificates, as shown in FIG. 3).

In the example shown, the method 900 includes a verifier obtaining the root certificates and cross-certificates between two root certificates, as well as intermediate certificates and cross certificates between two PM systems. For example, in the context of FIG. 3, each of certificates 302, 304, 312, 314, 322, 324, 332, 334 are retrieved. The verifier may be, for example, any device or entity useable to validate a certificate chain of that would receive the root and intermediate certificates for validation. Upon receipt of the various certificates, the verifier can perform traditional verification of the cross certificates between the two intermediate certificates (e.g., cross certificates 332, 334) using, for example, validation process is described in RFC 5280 (step 904).

Upon successful completion of the validation process of step 904, an enhanced verification process may be performed (step 906). The enhanced verification process will check the intermediate certificate that is being verified, and computes a hash value over the signature included in that intermediate certificate (step 908). The hash value may be computed using an algorithm specified in the extension that is included in the intermediate cross certificate that was signed by the alternate root certificate authority. In the example shown, the hash value is compared to a hash value in the intermediate cross-certificate AlternateHash extension that was signed by the alternate intermediate certificate authority (step 910).

At operation 912 it is determined whether the hash values are equal. If the hash values are not equal, the enhanced verification will fail. However, if the hash values are equal, at least from the perspective of the intermediate certificate, that certificate is a verified.

Notably, the enhanced verification process will also be performed on the alternate intermediate certificate. Specifically, a hash will be taken over the signature value of the alternate intermediate certificate, and compared to a hash value included in the cross certificate AlternateHash extension that was signed by the original intermediate certificate authority.

Assuming that both sets of hash values match, a successful verification of the root certificate is determined (step 914).

By way of illustration of the method 900 within the context of the arrangement shown in FIG. 3, in step 904, cross certificates 332, 334 would be validated using RFC 5280 processes. Then, during an enhanced verification process, validation of intermediate certificate 322 would involve comparison of hash values between the hash of the signature in intermediate certificate 322 and cross certificate 332 AlternateHash extension, and validation of intermediate certificate 324 would involve comparison of hash values between the hash of the signature in intermediate certificate 324 and the cross certificate 334 AlternateHash extension.

Referring now to FIG. 10, a method 1000 is shown for performing end entity path validation across two PM systems, according to an example embodiment. The method 1000 may be performed, for example, by a verifier seeking verification of end entity certificates held by a single end entity, e.g., an end entity receiving certificates 342, 344 based on operation of an end entity certificate issuance process, such as the one described above in connection with FIG. 7.

In the example shown, the method 1000 includes obtaining root certificates and related cross certificates of the bound PM systems, as well as intermediate certificates and intermediate cross certificates of those PM systems, alongside end entity certificates (step 1002). This may be performed using standard protocols defined in RFC 5280. Within the context of the system 300 of FIG. 3, this step includes obtaining, at the verifier, each of certificates 302, 304, 312, 314, 322, 324, 332, 334, 342, 344.

Upon obtaining each of the certificates, the verifier may perform verification processes on the end entity certificates using existing validation routines, such as those defined in RFC 5280 (step 1004). This involves, for example, verifying the chain of certificates from the end entity certificate to the root certificate within the same PM system. (e.g., validating the certificate chain 342, 322, 302, or the certificate chain 344, 324, 304).

Upon completion of the validation in step 1004, an enhanced verification process is performed (step 1006). Generally, the enhanced verification process verifies the validity of the end-entity certificates 342, 344 and upstream certificates across the PM systems. A detailed example of the enhanced verification process is described below in connection with FIG. 11. Generally, the enhanced verification process can lead to, for example, either failure of verification, or successful verification. Upon successful verification, a successful verification may be output (step 1007).

Figure 11:
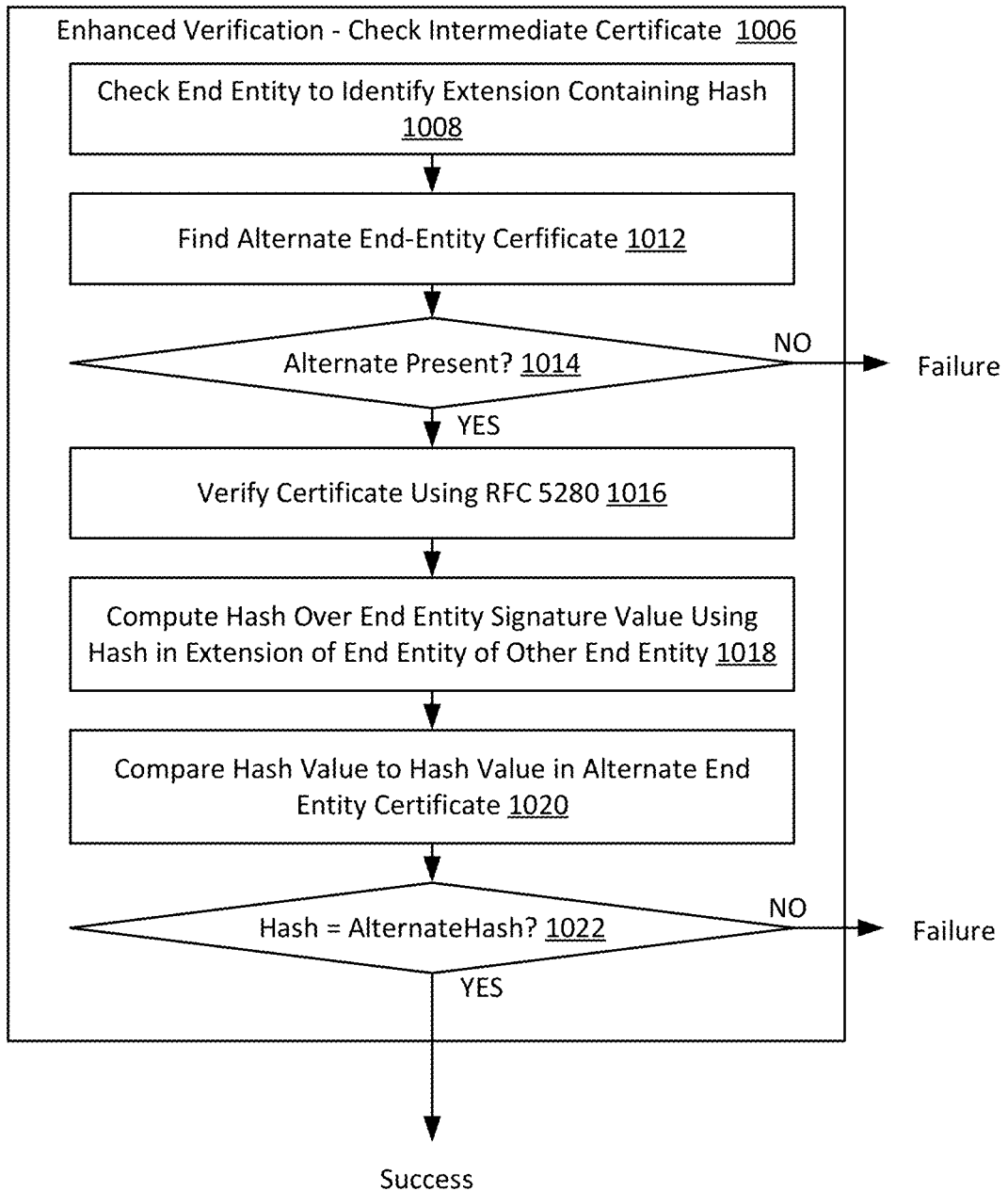
FIG. 11 illustrates an example enhanced verification process useable in the context of the end entity path validation of FIG. 10.

Referring to FIG. 11, additional details regarding an example enhanced verification process are provided. The example enhanced verification process 1006 may be performed within the context of verification described above in FIG. 10, and may be performed by a verifier entity to validate an end entity having end entity certificates associated with two or more certification systems.

In the example shown, the enhanced verification process 1006 can include, for example, assessing an end entity certificate associated with the end-entity, and identifying an extension containing a hash over the signature value (step 1008). This can include, for example, obtaining one or both of the end entity certificates that may be present at the end entity. If, at operation 1010, the extension is absent from the obtained end entity certificate, the verifier will attempt to find the alternate end entity certificate (step 1012). Additionally, in some cases, even if the extension is present, the alternate end entity certificate can be identified. This can include, for example, using RFC 5280 mechanisms, such as a local directory configuration or repository. Alternatively, the alternate end entity certificate could be included in a P7C package (PKCS #7 certificate list file) in an Authority Information Access (AIA) extension. In other words, in the example of FIG. 3, if the end entity certificate 344 is initially identified, the extension will be detected, and enhanced verification may proceed. If, however, the end entity certificate 342 is initially identified, various mechanisms will be used to identify end entity certificate 344, which contains the extension.

At operation 1014 if the end entity certificate that includes the extension and the end entity certificate lacking the extension are not both present, entity path validation will fail. However, if at operation 1010, the extension is present in the originally-accessed end entity certificate, or if at operation 1014 the alternate end entity certificate is found and contains such an extension, the located certificate(s) may be verified, for example using RFC 5280 path validation processes (step 1016).

In the example shown, the method further includes computing a hash over the original end entity signature value (step 1018). That is, the hash is computed over the signature value of the end entity certificate that does not include the extension, e.g., using EEM 346 of certificate 342, as seen in FIG. 3 This can be performed using a hash algorithm specified in the extension located in the alternate end entity certificate 344. In such an example, the computed hash value may be compared to a hash value in the alternate end entity certificate that was signed by the alternate root certificate (step 1020). If, at operation 1022, the hash values match, the enhanced verification process may complete successfully (e.g., leading to a successful verification output at step 1007 of FIG. 10). However, if the hash values do not match, validation of the end entity path will fail.

Referring to FIGS. 1-11 generally, in accordance with aspects of the present disclosure, it is noted that the present disclosure has a number of advantages over existing systems. For example, the arrangement described herein binds together two separate PM systems without requiring significant (or in some cases, any) change to structure of certificates, in particular and root certificates and intermediate certificates. Still further, use of hash values of unique attributes of the certificates allows for a compact addition to cross certificates. Furthermore the extension to the overall procedure required for validating trust in certificates adds little computational overhead. Additionally, this binding can be accomplished within the context of existing X.509 standards, ensuring compatibility between formats of certificates of the bound PM systems. Other advantages are presented by the present disclosure is well as reflected above and in the appended claims.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A computer-implemented method comprising:
receiving, from a first certificate authority at a second certificate authority, a cross certificate request, the cross certificate request including an attribute unique to the first certificate authority, wherein the attribute comprises a hash of a certificate signature associated with the first certificate authority;
generating a cross certificate at the second certificate authority and embedding the attribute unique to the first certificate authority as a certificate extension within the cross certificate;
wherein at least a portion of the cross certificate is signed with a key associated with the second certificate authority;
receiving, from the second certificate authority at the first certificate authority, a second cross certificate request, the second cross certificate request including an attribute unique to the second certificate authority;
generating, at the first certificate authority, a second cross certificate and embedding data including the attribute unique to the second certificate authority as a certificate extension within the second cross certificate;
wherein at least a portion of the second cross certificate is signed with a key associated with the first certificate authority.

2. The computer-implemented method of claim 1, wherein the first certificate authority and the second certificate authority comprise root certificate authorities.

3. The computer-implemented method of claim 1, wherein the first certificate authority and the second certificate authority comprise intermediate certificate authorities.

4. The computer-implemented method of claim 3, further comprising:
prior to generating the cross certificate:
receiving, from a first root certificate authority at a second root certificate authority, a further cross certificate request, the further cross certificate request including an attribute unique to the first root certificate authority; and
generating a further cross certificate and embedding the attribute unique to the first root certificate authority as a certificate extension within the further cross certificate;
wherein at least a portion of the further cross certificate is signed with a key associated with the second root certificate authority.

5. The computer-implemented method of claim 1, further comprising, based on the cross certificate lacking the embedded attribute, failing validation of the cross certificate.

6. The computer-implemented method of claim 1, wherein the first certificate authority uses a first key generation algorithm and the second certificate authority utilizes a second key generation algorithm different from the first key generation algorithm.

7. The computer-implemented method of claim 1, further comprising:
requesting certification of a public key of an end entity at the first certificate authority, the first certificate authority being an issuing certificate authority of the public key of the end entity; and
issuing a certification request from the first certificate authority to the second certificate authority.

8. The computer-implemented method of claim 7, further comprising:
certifying the public key of the end entity at the second certificate authority.

9. The computer-implemented method of claim 1, further comprising:
issuing a first end entity certificate to an end entity, the first end entity certificate being associated with the first certificate authority;
issuing a second end entity certificate to the end entity, the second end entity certificate being associated with the second certificate authority, the second end entity certificate including an extension that includes a hash of a signature of the second end entity certificate signed by the second certificate authority.

10. The computer-implemented method of claim 9, further comprising:
at a verifier, obtaining the first end entity certificate and the second end entity certificate;
verifying the first end entity certificate with the first certificate authority;
computing a hash of a signature of the first end entity certificate; and
comparing the hash of the signature of the first end entity certificate to the hash of a signature of the second end entity certificate to validate the end entity with both the first certificate authority and the second certificate authority.

11. A system comprising:
a first root certificate authority and a second root certificate authority, the first root certificate authority being communicatively connected to the second root certificate authority, and wherein:
the first root certificate authority implements a first digital signature scheme;
the second root certificate authority implements a second digital signature scheme different from the first digital signature scheme;
the first root certificate authority executing instructions to:
receive, from the second root certificate authority, a cross certificate request, the cross certificate request including an attribute unique to the second root certificate authority, wherein the attribute comprises a hash of a certificate signature associated with the first root certificate authority; and
generate a cross certificate and embedding the attribute unique to the second root certificate authority as a certificate extension within the cross certificate, wherein the cross certificate is signed with a key associated with the first root certificate authority;
the second root certificate authority executing instructions to:
receive, from the first root certificate authority, a second cross certificate request, the second cross certificate request including an attribute unique to the first root certificate authority, wherein the attribute comprises a hash of a certificate signature associated with the first root certificate authority; and
generate a second ross certificate and embedding the attribute unique to the first root certificate authority as a certificate extension within the second cross certificate, wherein the second cross certificate is signed with a key associated with the second root certificate authority.

12. The system of claim 11, further comprising the second root certificate authority.

13. The system of claim 12, wherein the first root certificate authority is implemented at a first node and the second root certificate authority is implemented at a second node communicatively coupled to the first node.

14. The system of claim 11, further comprising a first intermediate certificate authority and a second intermediate certificate authority, wherein the first intermediate certificate authority is configured to issue a first intermediate certificate signed by the first root certificate authority and the second intermediate certificate authority is configured to issue a second intermediate certificate signed by the second root certificate authority.

15. The system of claim 14, wherein the first intermediate certificate authority is configured to issue an intermediate cross certificate to the second intermediate certificate authority by embedding a hash into the cross certificate, the hash being a hash value based on a combination of an intermediate key associated with the first intermediate certificate authority and a signature generated at least in part based on a request from the second intermediate certificate authority including an attribute unique to the second intermediate certificate authority.

16. The system of claim 15, wherein the second intermediate certificate authority is configured to issue a second intermediate cross certificate complementary to the intermediate cross certificate.

* * * * *